United States Patent Office 3,227,756
Patented Jan. 4, 1966

3,227,756
N,N-MONO- AND DI-SUBSTITUTED-
ARALKYL AMINES
Sidney B. Richter and David P. Mayer, Chicago, Ill., assignors to Velsicol Chemical Corporation, Chicago, Ill., a corporation of Illinois
No Drawing. Filed July 10, 1962, Ser. No. 208,905
5 Claims. (Cl. 260—570.8)

This invention relates to the production of new pesticidal compositions of matter. More specifically, this invention relates to new chemical compounds of the general formula

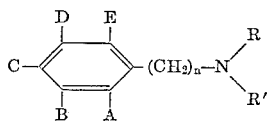

in which $n$ is a whole number from 1 to 3; A, B, C, D, and E are selected from the group consisting of lower unsubstituted alkoxy, chlorine and hydrogen, at least 2 of A, B, C, D, and E are chlorine, a minimum of 1 and a maximum of 2 of A, B, C, D, and E are lower unsubstituted alkoxy, provided that E is hydrogen when A, B, and C are lower unsubstituted alkoxy, chlorine, and hydrogen, respectively, and A is hydrogen when E, D, and C are lower unsubstituted alkoxy, chlorine and hydrogen, respectively; and R and R' are selected from the group consisting of unsubstituted lower alkyl unsubstituted lower alkenyl, lower monohydroxyalkyl, and hydrogen. By lower alkoxy, lower alkyl, lower alkenyl, and lower monohydroxyalkyl are meant those groups containing up to four carbon atoms. The new compounds of this invention are useful as pesticides, particularly as insecticides, miticides, and herbicides.

The new compounds of this invention can be prepared by the condensation of compounds of the formula

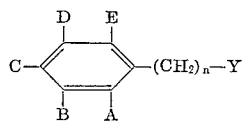

wherein $n$, A, B, C, D, and E are as defined above, and Y is chlorine or bromine with amines HNRR', wherein R and R' are also as defined above. Preferred starting materials of the given formula are those in which $n$ is one and A or B or C is lower unsubstituted alkoxy. Suitable starting materials of the formula given can be prepared from the corresponding aldehydes, anhydrides, or carboxylic acid esters by reduction to the corresponding alcohols followed by treatment with a reagent such as thionyl chloride. For example, reduction of an alkyl ester of a suitably ring-substituted benzoic acid with lithium aluminum hydride yields the corresponding benzyl alcohol, which can then be treated with thionyl chloride to give the ring-substituted benzyl chloride suitable for use as a starting material in preparing the compounds of this invention. Suitable starting materials in which $n$ is 2 or 3 can be prepared similarly from the appropriate phenylacetic and phenylpropionic acid esters, respectively.

Some typical carboxylic acids which can be used in the form of their alkyl esters to be converted to appropriate starting materials for this invention include, for example, 2-ethoxy-3,5-dichlorobenzoic acid, 2-methoxy-3,5-dichorophenylacetic acid, 3-methoxy-2,6-dichlorophenylacetic acid, 2,6-dimethoxy-3,5-dichlorobenzoic acid, 2-methoxy-3,5-dichlorobenzoic acid, 3-methoxy-2,6-dichlorobenzoic acid, 3-methoxy-2,4-dichlorobenzoic acid, 3-methoxy-4,6-dichlorobenzoic acid, 4-methoxy-2,3,5-trichlorobenzoic acid, and the like. Such substituted benzoic acids are known in the art or can be prepared readily. 2-Butoxy-3,5-dichlorobenzoic acid, for example, can be obtained from 3,5-dichlorosalicylic acid by treatment with butyl bromide in the presence of silver oxide.

When alkyl esters of these benzoic acids are reduced and chlorinated as described above, the resulting compounds useful as reactants in preparing the new compounds of the present invention are 2-ethoxy-3,5-dichlorobenzyl chloride, 2-methoxy-3,5-dichlorophenethyl chloride, 3-methoxy-2,6-dichlorophenethyl chloride, 2,6- dimethoxy-3,5-dichlorobenzyl chloride, 2-methoxy-3,5-dichlorobenzyl chloride, 3-methoxy-2,6-dichlorobenzyl chloride, 3-methoxy-2,4-dichlorobenzyl chloride, 3-methoxy-4,6-dichlorobenzyl chloride, 4 - methoxy - 2,3,5-trichlorobenzyl chloride, and 2-butoxy-3,5-dichlorobenzyl chloride, respectively.

Suitable reactants of the formula HNRR' include ammonia and a wide variety of primary and secondary amines wherein R and R' are as defined above. Some typical suitable reactants are, for example, isopropylamine, di-n-propylamine, dimethylamine, ethanolamine, methylamine, diethylamine, di-tert-butylamine, allylamine, diallylamine, 4-amino-1-butanol, 3-amino-1-butanol, diethanolamine, methylethylamine, and the like.

When the condensation reaction to form the new compounds of this invention is carried out, at least two moles of the amine should be used for each mole of the chloride or bromide, since the hydrogen halide released during the reaction is taken up by some of the free amine. The reaction can be carried out conveniently by heating the reactants, preferably in an inert solvent such as benzene or toluene. The exact reaction temperatures are not critical, since the reaction will often take place at normal room temperature; however, temperatures which are the normal reflux temperature of the reaction mixture are preferred. The reaction will often be complete in a few hours. Generally, a precipitate of amine hydrochloride or hydrobromide will form in the reaction mixture and can be filtered off. The product can be isolated from the reaction mixture by ether extraction; and it can be purified by crystallization, fractional distillation, or other techniques known to the art. Although the reaction is normally carried out at atmospheric pressure, sub- or superatmospheric pressures can also be used if desired.

The manner in which typical new compounds of this invention can be prepared is illustrated in the following examples. All temperatures are in degrees centigrade.

EXAMPLE 1

*Preparation of 4-methoxy-3,5-dichlorobenzyl alcohol*

A solution of methyl 4-methoxy-3,5-dichlorobenzoate (37.7 g.; 0.16 mole) in 750 ml. ether was added dropwise to a well-stirred slurry of 9 g. lithium aluminum hydride in 300 ml. ether at such a rate as to maintain gentle reflux. The mixture was refluxed for 1 hr., cooled, and treated dropwise over a period of 2 hrs. with 250 ml. of 10% $H_2SO_4$. The ether layer was washed with water, dried over magnesium sulfate, and filtered. Evaporation of the ether gave an oil, which was distilled in vacuo to give 24 g. (73% of theory) of 4-methoxy-3,5-dichlorobenzyl alcohol, colorless oil, B.P. 126°/1.5 mm., which crystallized to a white solid, M.P. 42–44°.

EXAMPLE 2

*Preparation of 4-methoxy-3,5-dichlorobenzyl chloride*

Thionyl chloride (16 g.; 0.14 mole) was added dropwise with stirring to 4-methoxy-3,5-dichlorobenzyl alcohol (24 g.; 0.11 mole) and pyridine (9 g.; 0.11 mole) in 250 ml. toluene. The mixture was stirred and refluxed for 4 hrs., cooled, and filtered. The solvent and excess thionyl chloride were distilled off, and the residue was distilled in vacuo to give 21 g. (85% of theory) of 4-methoxy-3,5-dichlorobenzyl chloride, pale yellow oil, B.P. 100–103°/0.7 mm., n 27/D 1.5670.

EXAMPLE 3

*Preparation of N-isopropyl-4-methoxy-3,5-dichlorobenzylamine*

A mixture of 250 g. 4-methoxy-3,5-dichlorobenzyl chloride, 133 g. isopropylamine, and 500 ml. benzene is stirred and refluxed for 8 hours. The cooled reaction mixture is treated with 500 ml. of 10% NaOH solution and then shaken with 500 ml. of benzene. The benzene layer is washed with water, dried over sodium sulfate, filtered, and evaporated. The residue is fractionally distilled under reduced pressure to give the desired N-isopropyl-4-methoxy-3,5-dichlorobenzylamine.

A wide variety of other new compounds within the scope of this invention can be prepared in a manner similar to that detailed above. Given in the following examples are the reactants which can be used to prepare the indicated named compounds of this invention.

EXAMPLE 4

2 - ethoxy - 3,5 - dichlorobenzyl chloride+methylamine=N - methyl - 2 - ethoxy - 3,5 - dichlorobenzylamine.

EXAMPLE 5

2 - methoxy - 3,5 - dichlorophenethyl chloride+dimethylamine=N,N - dimethyl - 2 - methoxy - 3,5 - dichlorophenethylamine.

EXAMPLE 6

3 - methoxy - 2,6 - dichlorophenethyl chloride+ethylamine=N - ethyl - 3 - methoxy - 2,6 - dichlorophenethylamine.

EXAMPLE 7

2,6 - dimethoxy - 3,5 - dichlorobenzyl chloride+diethylamine=N,N - diethyl - 2,6 - dimethoxy - 3,5 - dichlorobenzylamine.

EXAMPLE 8

2 - methoxy - 3,5 - dichlorobenzyl chloride+propylamine=N-n-propyl - 2 - methoxy - 3,5 - dichlorobenzylamine.

EXAMPLE 9

3 - methoxy - 2,6 - dichlorobenzyl chloride+diisopropylamine=N,N - diisopropyl - 3 - methoxy - 2,6 - dichlorobenzylamine.

EXAMPLE 10

3 - methoxy - 2,4 - dichlorobenzyl chloride+butylamine=N - n - butyl - 3 - methoxy - 2,4 - dichlorobenzylamine.

EXAMPLE 11

3 - methoxy - 4,6 - dichlorobenzyl chloride+allylamine =N - allyl - 3 - methoxy - 4,6 - dichlorobenzylamine.

EXAMPLE 12

4 - methoxy - 2,3,5 - trichlorobenzyl chloride+diallylamine=N,N - diallyl - 4 - methoxy - 2,3,5 - trichlorobenzylamine.

EXAMPLE 13

2 - methoxy - 5,6 - dichlorobenzyl chloride+dimethylamine=N,N - dimethyl - 2 - methoxy - 5,6 - dichlorobenzylamine.

EXAMPLE 14

3 - methoxy - 4,6 - dichlorobenzyl chloride+di-n-propylamine=N,N-di-n-propyl - 3 - methoxy - 4,6 - dichlorobenzylamine.

EXAMPLE 15

4 - methoxy - 5,6 - dichlorobenzyl chloride+isopropylamine=N - isopropyl - 4 - methoxy - 5,6 - dichlorobenzylamine.

EXAMPLE 16

4 - methoxy - 2,6 - dichlorobenzyl chloride+ethanolamine=N - (2 - hydroxyethyl) - 4 - methoxy - 2,6 - dichlorobenzylamine.

EXAMPLE 17

2 - methoxy - 5,6 - dichlorophenethyl chloride+allyamine=N - allyl - 2 - methoxy - 5,6 - dichlorophenethylamine.

EXAMPLE 18

4 - methoxy - 2,3,5 - trichlorobenzyl chloride+ammonia=4 - methoxy - 2,3,5 - trichlorobenzylamine.

For practical use as pesticides, the compounds of this invention are generally incorporated into herbicidal, insecticidal, and miticidal compositions which comprise an inert carrier and a pesticidally toxic amount of such a compound. Such compositions, which are usually known in the art as formulations, enable the active compound to be applied conveniently to the site of the pest infestation in any desired quantity. These compositions can be solids such as dusts, granules, or wettable powders; or they can be liquids such as solutions or emulsifiable concentrate.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the pest infestation. The emulsifiers most commonly used in these concentrates are nonionic or mixtures of nonionic with anionic surface-active agents.

A typical composition according to this invention is illustrated by the following example, in which the quantities are in parts by weight.

EXAMPLE 19

*Preparation of a dust*

Product of Example 3 _____ 10
Powdered talc _____ 90

The above ingredients are mixed in a mechanical grinder-blender and are ground until a homogeneous, free-flowing dust of the desired particle size is obtained. This dust is suitable for direct application to the site of the pest infestation.

The pesticides of this invention can be applied in any manner recognized by the art. The concentration of the new compounds of this invention in the compositions will vary greatly with the type of formulation and the purpose for which it is designed, but generally the compositions will comprise from about 0.05 to about 95 percent by weight of the active compounds of this invention. In a preferred embodiment of this invention, the compositions will comprise from about 5 to about 75 percent by weight of the active compound. The compositions can also comprise such additional substances as other pesticides, spreaders, adhesives, stickers, fertilizers, activators, synergists, and the like.

The new compounds of this invention can be used in many ways for the control of insects and mites. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systematically.

The above methods of using insecticides are based on the fact that almost all the injury done by insects is a direct or indirect result of their attempts to secure food. Indeed, the large number of destructive insects can be classified broadly on the basis of their feeding habits. There are, for example, the chewing insects such as the Mexican bean beetle, the southern armyworm, cabbageworms, grasshoppers, the Colorado potato beetle, the cankerworm, and the gypsy worm. There are also the piercing-sucking insects, such as the pea aphid, the house fly, the chinch bug, leafhoppers, and plant bugs.

Another group of insects comprises the internal feeders. These include borers such as the European corn borer and the corn earworm; worms or weevils such as the codling moth, cotton boll weevil, plum curculio, melonworm, and the apple maggot; leaf miners such as the apple leaf miner and the beet leaf miner; and gall insects such as the wheat jointworm, and grape phylloxera. Insects which attack below the surface of the ground are classified as subterranean insects and include such destructive pests as the wooly apple aphid, the Japanese beetle, and the corn rootworm.

Mites and ticks are not true insects. Many economically important species of mites and ticks are known, including the red spider mite, the strawberry spider mite, the cattle tick, and the poultry mite. Chemicals useful for the control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding while a pound or more of active compound per acre may be required for the control of a heavy infestation of insects under conditions favorable to their development.

Weeds are undesirable plants in their growing where they are not wanted, having no economic value, and interfering with the production of cultivated crops or with the welfare of livestock. Many types of weeds are known, including annuals such as pigweed, lambsquarters, yellow foxtail, crabgrass, wild mustard, French-weed, rye-grass, goose-grass, chickweed, and smartweed; biennials such as wild carrot, great burdock, mullein, round-leaved mallow, blue thistle, bull thistle, hounds-tongue, moth mullein, and purple star thistle; or perennials such as white cockle, perennial rye-grass, quackgrass, Johnson grass, Canada thistle, hedge bindweed, Bermuda grass, sheep sorrel, field chickweed, and winter-cress. Similarly, such weeds can be classified as broad-leaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds growing under adverse conditions, the application of one pound or more of active compound per acre may be required for good control of a dense infestation of hardy weeds growing under favorable conditions.

The herbicidal toxicity of the new compounds of this invention can be illustrated by many of the established testing techniques known to the art. For example, emulsifiable concentrate compositions can be diluted with water to concentrations equivalent to 4 pounds of the active compound per acre. Duplicate paper pots filled with a sand and soil mixture are seeded with weeds; and immediately after seeding, the soil surface of each pot is sprayed with an appropriately diluted test solution. The weed growth is maintained under artificial lighting with irrigation provided by placing the porous pots in a small amount of water in stainless steel trays. The weeds are observed for a week to ten days; and the percent kill, injury, and stand reduction are recorded. The results indicate a high order of herbicidal activity of the compounds of this invention. Comparable pre-planting or post-emergence tests can also be used.

What is claimed is:
1. A compound of the general formula

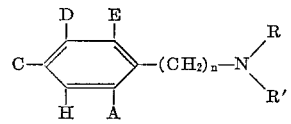

in which $n$ is a whole number from 1 to 3; A, C, D and E are selected from the group consisting of lower unsubstituted alkoxy, chlorine and hydrogen, at least 2 of A, C, D, and E are chlorine, A, C, D, and E is lower unsubstituted alkoxy, and R and R' are selected from the group consisting of unsubstituted lower alkyl, unsubstituted lower alkenyl, lower monohydroxyalkyl, and hydrogen.

2. N,N - dimethyl-2-methoxy-5,6-dichlorobenzylamine.
3. N-isopropyl-4-methoxy-5,6-dichlorobenzylamine.
4. N - (2-hydroxyethyl)-4-methoxy-2,6-dichlorobenzylamine.
5. N-allyl-2-methoxy-5,6-dichlorophenethylamine.

References Cited by the Examiner
UNITED STATES PATENTS

| | | | |
|---|---|---|---|
| 2,608,584 | 8/1952 | Sprules et al. | 260—570.9 |
| 2,763,616 | 9/1956 | Brooks | 260—570.9 X |
| 2,783,277 | 2/1957 | Hiltmann | 260—570.9 |
| 2,862,966 | 12/1958 | Surrey | 260—570.9 |
| 2,864,679 | 12/1958 | Hamm et al. | 71—2.3 |
| 2,884,455 | 8/1959 | Robertson et al. | 260—570.8 |
| 2,927,053 | 3/1960 | Eden | 260—570.9 |
| 2,962,531 | 11/1960 | Coffield | 260—570.9 |
| 2,981,619 | 4/1961 | Josephs | 71—2.3 |
| 3,070,628 | 12/1962 | Lemin | 260—570.9 |
| 3,072,472 | 1/1963 | Josephs | 71—2.3 |

OTHER REFERENCES

Benington et al., "Jour. Organic Chem.," vol. 23, pages 1979–84 (1958).

Merchant et al., "Jour. Organic Chem.," vol. 23, pages 1774–6 (1958).

CHARLES B. PARKER, *Primary Examiner.*
JULIAN S. LEVITT, *Examiner.*